United States Patent Office 3,660,476
Patented May 2, 1972

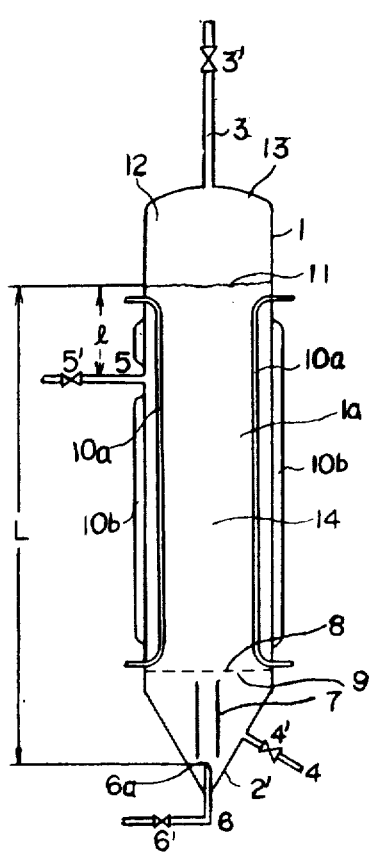
FIG-1
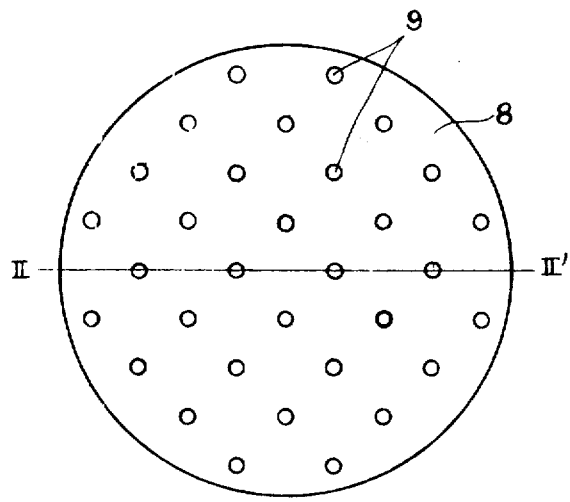
FIG-2-a
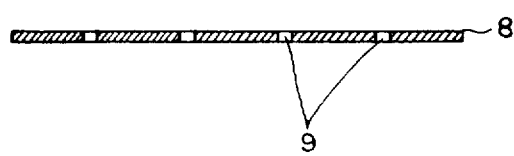
FIG-2-b
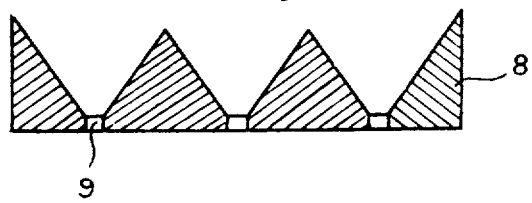
FIG-3-b
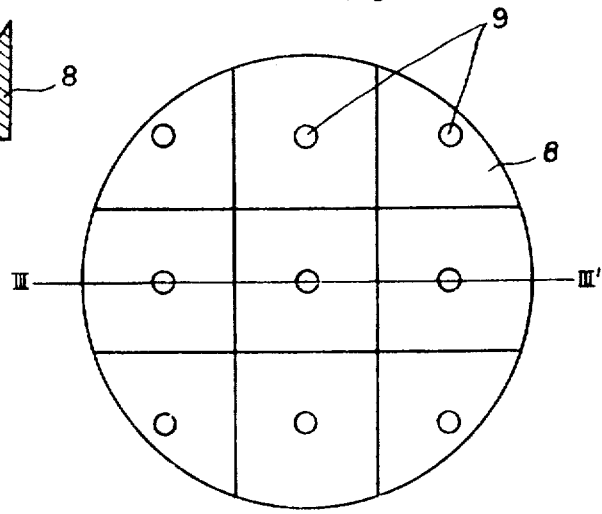
FIG-3-a

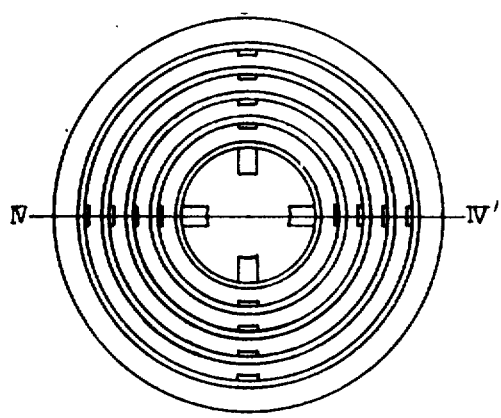
FIG-4-a
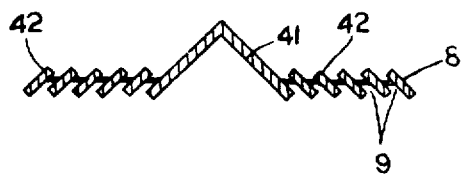
FIG-4-b
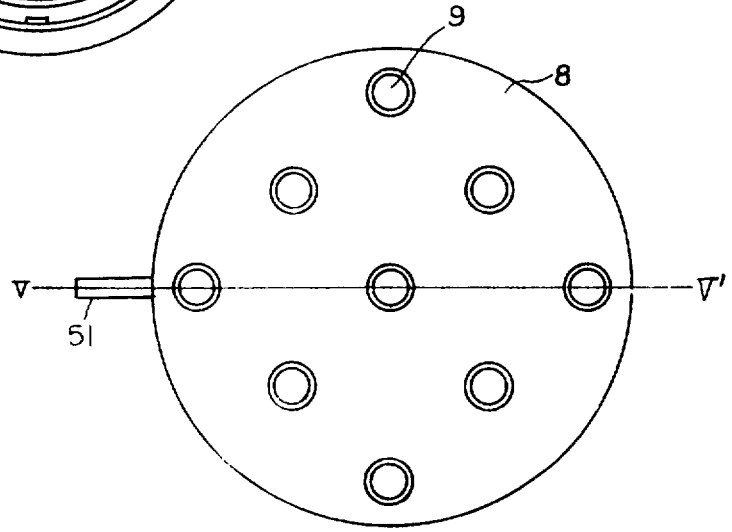
FIG-5-a
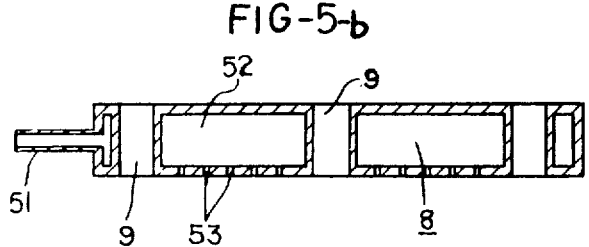
FIG-5-b
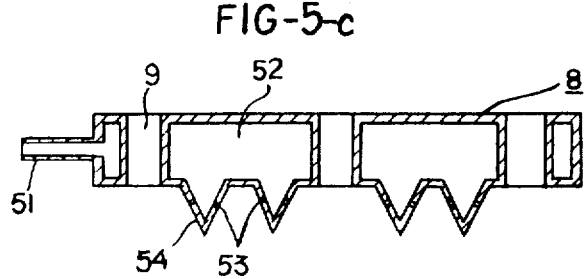
FIG-5-c

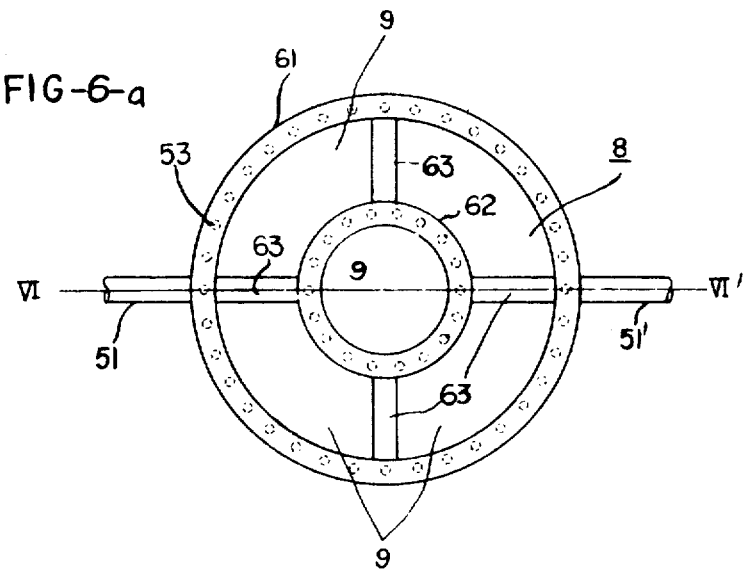
FIG-6-a
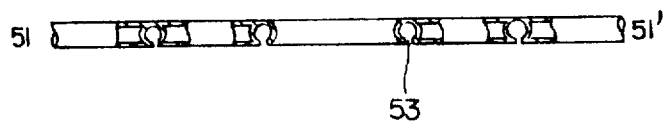
FIG-6-b
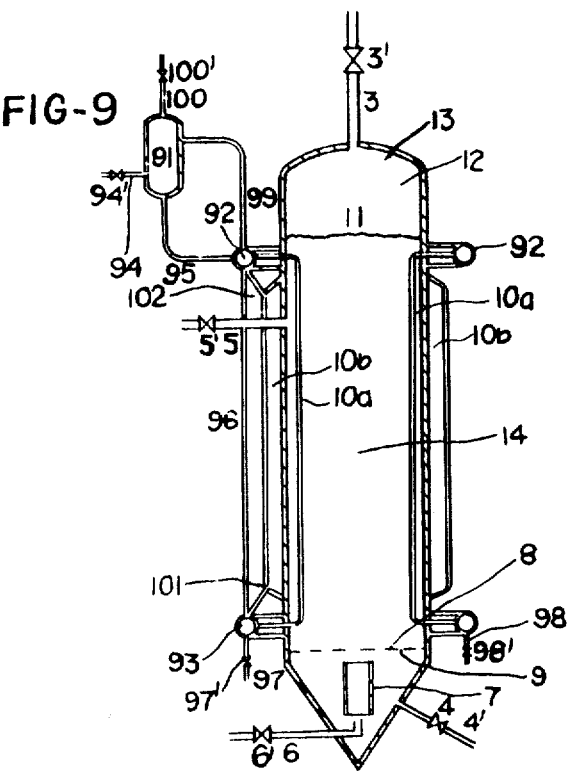
FIG-9

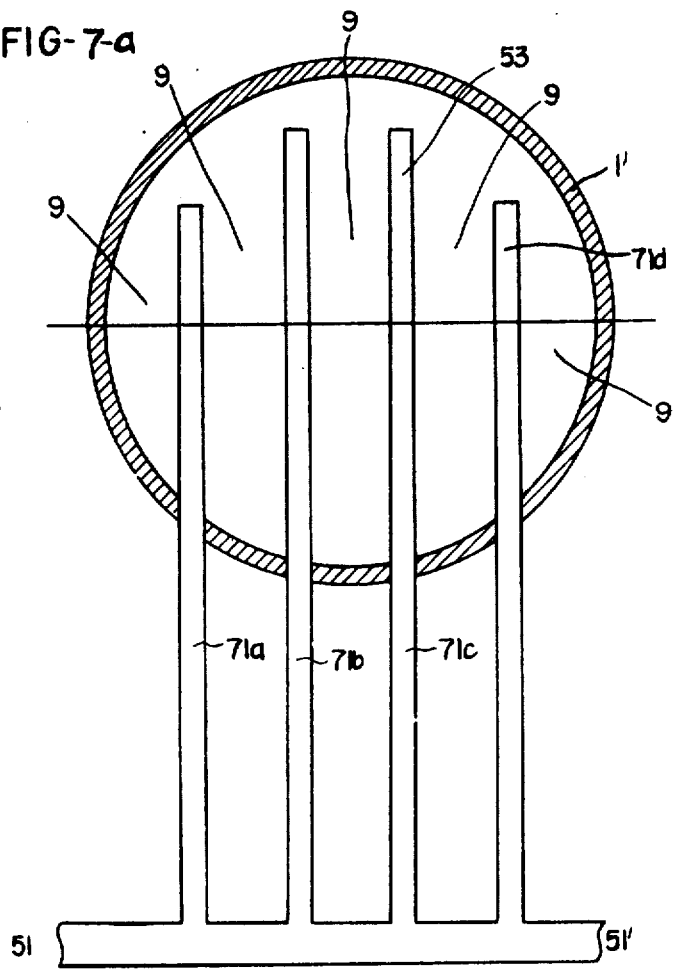
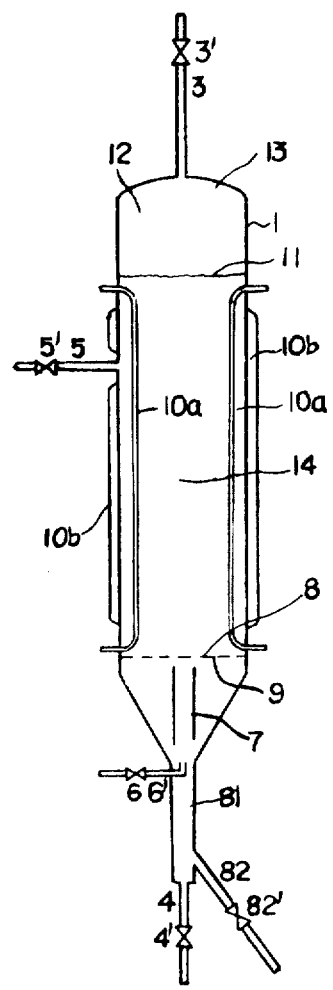
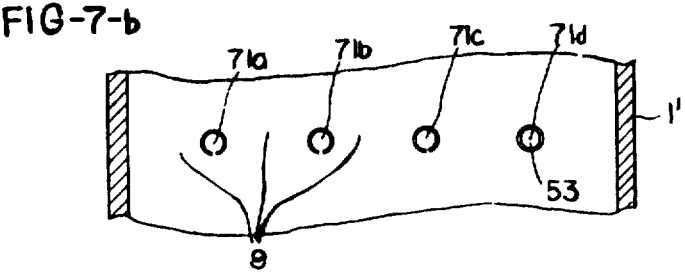

3,660,476
METHOD FOR THE PREPARATION OF TEREPHTHALIC ACID
Yataro Ichikawa, Gentaro Yamashita, and Yuichi Akachi, Iwakuni-shi, Japan, assignors to Teijin Limited, Osaka, Japan
Filed Oct. 30, 1968, Ser. No. 771,877
Int. Cl. C07c 63/02
U.S. Cl. 260—524 R                    5 Claims

ABSTRACT OF THE DISCLOSURE

An apparatus for continuous production of terephthalic acid from p-dialkylbenzene and molecular oxygen with high utilization ratio of said oxygen, which comprises a reactor with its bottom tapered downwards, the reactor being provided with a gas exhaust pipe at an upper part, an exit for the reaction product at the bottom portion, and a starting material feed pipe at a suitable position therebetween; a gas sparger for supplying molecular oxygen which opens into the reactor at the bottom portion; a draft tube with open top and bottom, which is positioned above the gas sparger; and a gas distributor for dispersing the molecular oxygen into the reactor, which is positioned above and appropriately spaced from the draft tube; furthermore the reactor being provided with a heating and/or cooling means for maintaining the reaction material in the reactor at a temperature of 80–150° C.; whereby p-dialkylbenzene, an aliphatic mono-carboxylic acid and a heavy metal catalyst, are supplied from the starting material feed pipe, and at least a part of the molecular oxygen is supplied from the gas sparger.

---

Figure 10:
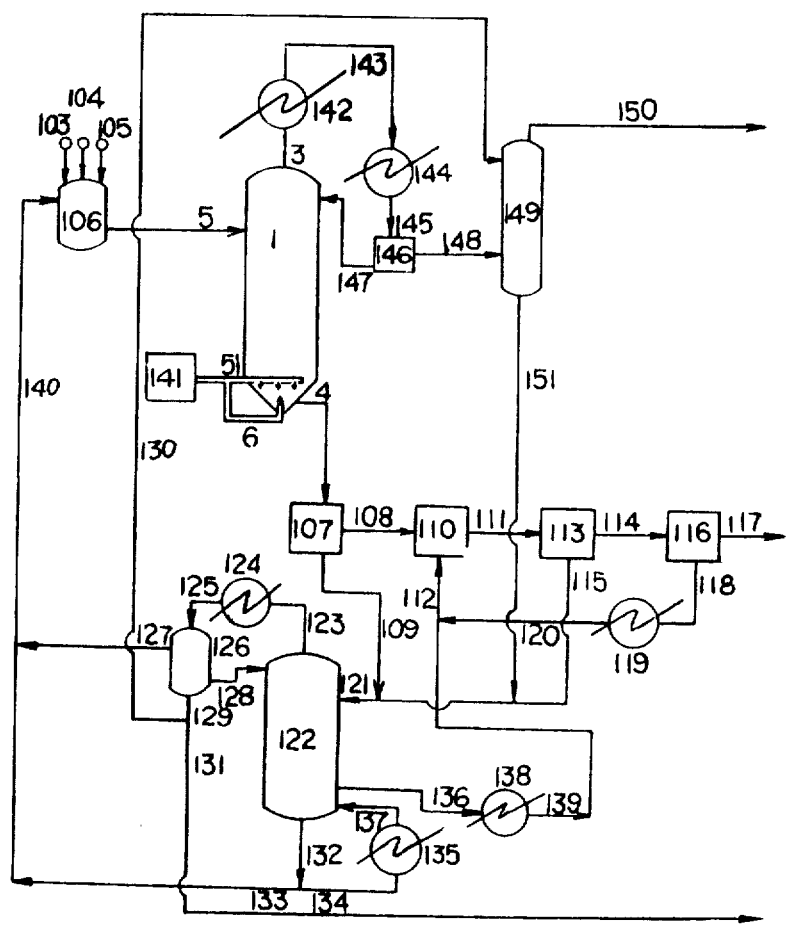

This invention relates to an apparatus and method for the preparation of terephthalic acid from p-dialkylbenzene or intermediate oxidation product thereof. More particularly, the invention relates to an apparatus in which p-dialkylbenzene or intermediate oxidation product thereof as the starting material is oxidized with molecular oxygen, in a liquid reaction medium and in the presence of a heavy metal oxidation catalyst, to form terephthalic acid; and also to an industrial method for the preparation of high purity terephthalic acid using the apparatus, at high yields and with stable operation.

In the past, preparation of terephthalic acid by the oxidation of p-dialkylbenzene or intermediate oxidation product thereof (hereinafter they will be referred to collectively as p-dialkylbenzene) with molecular oxygen in a liquid reaction medium and in the presence of a heavy metal oxidation catalyst has been the object of much industrial concern, and a large number of modifications have been proposed with respect thereto. Examples of the prior art include: (1) a process performing the oxidation in the presence of an organic acid salt of a heavy metal such as cobalt or manganese acetate, and also a bromine compound such as ammonium bromide, as described in U.S. Pat. No. 2,833,816; (2) a process performing the reaction in the presence of an organic acid salt of cobalt and methylenic ketone such as methyl ethyl ketone as described in U.S. Pat. No. 2,853,514; (3) a process performing the reaction in the presence of an organic acid salt of cobalt and an aliphatic aldehyde such as acetaldehyde, as described in U.S. Pat. No. 2,673,217; (4) a process performing the oxidation in the presence of a cobalt compound and peraldehyde, as described in British Pat. No. 1,043,426; (5) a process employing an organic acid salt of cobalt as the catalyst, in which furthermore ozone ($O_3$) is used as the reaction initiator, as described in U.S. Pat. No. 2,992,271; (6) a process performing the oxidation in the presence of cobalt acetate and hydrobromic acid, as described in U.S. Pat. No. 3,139,452; (7) a process performing the oxidation in the presence of a large quantity of cobalt compound, as described in U.S. Pat. No. 3,334,145; (8) a process performing the oxidation in the presence of cobalt compound and such compounds as scandium, yttrium, lanthanum, neodymium, gadolinium, thorium, zirconium, hafnium, etc., as described in U.S. Pat. No. 3,299,125; and (9) a process for oxidizing a mixture of p-xylene and p-toluic acid in the presence of, for example, manganese acetate, as described in French Pat. No. 1,262,259 .

In all of the above-named processes (1) through (9), lower aliphatic monocarboxylic acids, particularly those of 2–4 carbons, such as acetic acid, are used as the liquid reaction media. Other processes using different compounds as the liquid reaction media include: (10) a process using γ-butyrolactone, as described in German Pat. No. 1,100,015; (11) a process using organic nitriles such as benzonitrile, as described in German Pat. No. 1,117,099; (12) a process using cyclic carbonate such as ethylene carbonate propylene carbonate, etc., as described in German Pat. No. 1,132,115; and (13) a process using benzoates such as methyl benzoate, as described in German Pat. No. 1,144,708.

The above-listed various processes possess a common feature in that the terephthalic acid is prepared by oxidation of p-dialkylbenzene with molecular oxygen, in liquid reaction medium and in the presence of heavy metal oxidation catalyst.

The object of the present invention is to provide an apparatus and method useful for the preparation of terephthalic acid from p-dialkylbenzene similar to the foregoing processes, which process provides for the stable, continuous operation, high utilization ratio of molecular oxygen and preparation of high purity terephthalic acid at high yields.

Other objects and advantages of the invention will become apparent from the following description.

According to the invention, the above objects and advantages are essentially accomplished by an apparatus for making terephthalic acid from p-dialkylbenzene or intermediate oxidation product thereof, which comprises a reactor with its bottom tapered downwards, the reactor being provided with a gas exhaust pipe at an upper part, an exit for the reaction product at the bottom portion, and a starting material feed pipe at a suitable position therebetween; a gas sparger for supplying molecular oxygen or molecular-oxygen-containing gas, which opens into the reactor at the bottom portion; a draft tube with an open top and bottom, which is positioned above the gas sparger; and a gas distributor for dispersing molecular oxygen or molecular-oxygen-containing gas inside the reactor, which is positioned above and appropriately spaced from the draft tube; furthermore the reactor is equipped with a heating and/or cooling means for maintaining the reaction materials in the reaction at the predetermined reaction temperature; whereby p-dialkylbenzene or intermediate oxidation product thereof, liquid reaction medium and catalyst are supplied from the material feed pipe, and at least a part of molecular oxygen or molecular-oxygen-containing gas is supplied from the gas sparger.

The invention will be hereinafter explained in further detail with reference to the attached drawings, for easier understanding.

In the drawings:

FIG. 1 is a vertical section showing the fundamental structure of the subject apparatus;

FIGS. 2a, 2b; 3a, 3b; and 4a, 4b; illustrate a few examples of the distributor to be attached inside the subject apparatus, the drawings of suffix a being the plan views seen from the direction of line I—I in FIG. 1, and those of suffix b being the cross sections thereof, each along the line indicated in the corresponding *a*-drawing;

FIGS. 5, 6, and 7 show other embodiments of distributors of the type different from those shown in FIGS. 2*a*, *b*–4*a*, *b*, in which the relation of *a*- and *b*-drawings is the same as above, except FIG. 5*c* which shows a somewhat modified structure of the embodiment illustrated in FIG. 5*b*;

FIGS. 8 and 9 each show still other embodiment of the subject apparatus; and

FIG. 10 is a flow sheet showing the general sequence of an entire operation system for making terephthalic acid using the subject apparatus and recovering the object product from the reaction liquid, as well as recovering the volatile reaction material and reaction medium from the exhaust gas.

In the drawings, the common parts are identified with the same numerals.

FIG. 1 is a vertical section showing the most basic structure of the subject apparatus, in which 1 denotes a closed-type reactor with a tapered bottom 2. On the top of the reactor 1, a gas exhaust pipe 3 is provided, and at an optional position of the tapered bottom 2, an exit for the reaction product is provided. Also the first gas sparger 6 is attached at the lower end, or in the vicinity thereof, of the tapered bottom 2. On the side of the reactor 1, a material feed pipe 5 is attached, and through which the reaction material, i.e., a mixture of p-dialkylbenzene, catalyst and liquid reaction medium, is supplied into the reactor 1. The numeral 11 indicates the level of the reaction liquid in the reactor.

The molecular oxygen or molecular-oxygen-containing gas (hereinafter they will be collectively referred to as molecular-oxygen-containing gas) to be contacted with the above reaction material to oxidize the p-dialkylbenzene therein, is directly blown into the reaction liquid from the bottom of the reactor 1, through the first gas sparger 6. The gas passes through the draft tube 7 with open top and bottom which is provided above the open end of the first gas sparger 6, and rises as countercurrently contacting with the reaction liquid, while being uniformly dispersed in the reactor 1 by a distributor 8 which has plural passages 9 for the molecular-oxygen-containing gas as well as for the reaction liquid. The gas eventually reaches the gas phase 12 at the upper part of the reactor 1 and is discharged through the gas exhaust pipe 3, while the gas phase 12 is maintained at the predetermined pressure level by means of a pressure detecting element 13. Incidentally 3', 4', 5' and 6' each denote a valve, which may be of the ordinary type or a continuously operable control valve.

In order to maintain the reaction liquid in the reactor/ at a predetermined temperature, heating and/or cooling devices 10*a* and 10*b* are provided, respectively, at the inside and outside of the reactor 1. Those heating and/or cooling devices may be designed to be a communicating system, or as two different systems. Normally, however, it is desirable to connect them for ease of operation.

Also a temperature detector 14 is set in the reactor 1, for the purpose of keeping the temperature of the reaction liquid in the reactor constant. The location of the temperature detector 14 is not critical, as long as it is located higher than the distributor in the reactor 1. Normally, however, it is desirable to provide such temperature detector 14 at approximately the center portion of the reactor 1.

Hereinafter the case of practicing the subject method using the apparatus illustrated in FIG. 1 will be explained in full detail.

In working the subject method using the apparatus of FIG. 1, first the following starting materials are fed into the reactor through the material feed pipe 5;

(a) p-dialkylbenzene,
(b) aliphatic monocarboxylic acid of 2–4 carbons (liquid reaction medium), and (c) heavy metal oxidation catalyst, and valve 6' on the first gas sparger 6 at the bottom of reactor 1 is opened to feed the molecular-oxygen-containing gas of a suitable pressure. At the initiation of the reaction, the reaction heat is rapidly generated. Therefore it is desirable to initially feed a liquid mixture of the above liquid reaction medium and the catalyst only or a low p-dialkylbenzene concentration reaction liquid, into the reactor, and to supply thereto the molecular-oxygen-containing gas through the first gas sparger 6, followed by heating of the system by means of the heating and/or cooling devices 10*a* and 10*b*. When the temperature reaches the predetermined reaction temperature ranging 80–150° C., the reaction material containing p-dialkylbenzene at the predetermined concentration is supplied through the pipe 5 to continue the reaction.

The normally preferred composition of the starting material is as follows:

(a) per 1 part by weight of p-dialkylbenzene,
(b) 0.5–20, particularly 1–10 parts by weight of the aliphatic monocarboxylic acid, and
(c) per 1 gram-mol of p-dialkylbenzene, a heavy metal catalyst of the quantity corresponding to $1 \times 10^{-5}$ to 2.0, preferably $1 \times 10^{-3}$ to 1.0, gram-atom of the heavy metal.

Thus the molecular-oxygen-containing gas fed through the first gas sparger 6 passes through the draft tube 7 and wherein forms and air lift effect, constituting a circulation current of the reaction liquid containing the reaction product at the bottom portion 2 of reactor 1, throughout the inside and outside of the draft tube 7. The molecular-oxygen-containing gas passes through the passages 9 in the distributor 8, to rise through the main reaction zone 1*a* formed above the distributor 8 in the reactor 1, while being uniformly dispersed. In the main reaction zone 1*a*, the gas intimately and countercurrently contacts with the liquid reaction material continuously fed from the material supply pipe 5, and oxidizes the p-dialkylbenzene. Also the exhaust gas is discharged through the exhaust pipe 3, at a regulated rate so as to control the pressure in the gas phase portion 12 to a predetermined level. On the other hand, the solid terephthalic acid formed in the main reaction zone 1*a* goes down with the downward flow of the reaction liquid through the passages 9 in the distributor 8, together with the intermediate oxidation products such as, for example, p-toluic acid (PTA), 4-carboxybenzaldehyde (4CBA), etc., to the bottom portion 2 of reactor 1, whereat the products enter into the aforementioned circulation current. Consequently the intermediate oxidation products are further oxidized with the molecular oxygen-containing gas and converted to terephthalic acid, and the solid terephthalic acid is sufficiently suspended in the liquid reaction medium by the action of the circulation current. Thus the terephthalic acid can be withdrawn outside the reaction system from the exit 4, without forming deposit or scales on the walls of the bottom portion 2. The withdrawal may be performed continuously or intermittently.

Furthermore, with the use of the subject apparatus as in the above, the molecular-oxygen-containing gas fed from below is uniformly dispersed in the entire area of the main reaction zone 1*a* by the distribution action of the distributor 8, so that no dead space is formed in the main reaction zone 1*a*. Also at the bottom portion 2 of reactor 1, the reaction liquid and product form a good circulation current due to the air lift effect of the molecular-oxygen-containing gas fed from the first gas sparger 6, in the draft tube 7. This circulation current, together with the tapered structure of the bottom portion 2, contribute to eliminate dead space in that area.

Accordingly, when the subject method is practiced with the use of such an apparatus, the molecular-oxygen-containing gas fed from the first gas sparger 6 is very effectively utilized in the entire area of the reactor 1, and intimately contacted with the reaction liquid. Thus, in accordance with the invention, high purity terephthalic acid can be obtained at high yields. Furthermore, due to the dispersion and agitation effect of the molecular-oxygen-containing gas in the entire area of reactor 1, scaling of the reaction product on the inside walls of the reactor at the main reaction zone 1a or surface of the heating and/or cooling devices 10a and 10b is prevented. Also at the bottom portion 2 of reactor 1, the smooth circulation current effectively prevents the deposition and scaling of the solid reaction product on the reactor walls.

We furthermore discovered that, in practicing the method of the invention, loss of unreacted p-dialkylbenzene which is discharged outside the reaction system accompanying the exhaust gas can be reduced, and short pass of p-dialkylbenzene and aforesaid intermediate oxidation products can be prevented so as to maintain their residence time at a predetermined length, when $l/L$ is made ¼–⅓, L being the distance from the entrance of the first gas sparger 6a for supplying molecular-oxygen-containing gas into the reaction liquid, to the reaction liquid level 11 in the reactor 1, and $l$ being the distance from the entrance of the material feed pipe 5 for supplying the starting mixture consisting of p-dialkylbenzene, aliphatic monocarboxylic acid of 2–4 carbons and heavy metal oxidation catalyst into the reactor, to the reaction liquid level 11.

When the molecular-oxygen-containing gas passes through the reactor 1, the volatile component in the reaction liquid evaporates into the gas, and an equillibrium of the volatile component is established between the gas and liquid phases. Thus a part of p-dialkylbenzene is carried by the molecular-oxygen-containing gas and discharged from the reaction system. Therefore, the greater is the concentration of p-dialkylbenzene in the reaction liquid, the more p-dialkylbenzene is carried off by the molecular-oxygen-containing gas, i.e., the quantity of the p-dialkylbenzene to be effectively utilized in the reaction is reduced. Again, when the feed entrance of the starting mixture is located close to the exit of reaction product, short pass of p-dialkylbenzene and intermediate oxidation products thereof more frequently occurs, and thereby the unreacted material or the intermediate oxidation products remain as residue. Thus the terephthalic acid conversion based on the p-dialkylbenzene supply becomes objectionably low. Whereas, the foregoing drawbacks can be eliminated by supplying the starting reaction liquid at such a rate as will make $l/L$, ¼–⅓, as afore-said, and the completeness of the oxidation reaction of p-dialkylbenzene can be improved.

In practicing the invention, furthermore, it is preferred to control the total quantity of the molecular oxygen or of the molecular-oxygen-containing gas to be supplied into the reactor, so as to make the superficial mass velocity thereof through the reaction liquid in the main reaction zone 1a of reactor 1, without channelling, 0.8–20 cm.$^3$/cm.$^2$.sec., preferably 0.9–10 cm.$^3$/cm.$^2$.sec.

In the subsequent descriptions, the above-specified rate or velocity of the molecular-oxygen-containing gas will be referred to simply as the superficial gas velocity. According to the invention, the growth rate of scales of the reaction product on the walls of reactor 1 at the main reaction zone 1a and on the tubular walls of the heating and/or cooling devices 10a and 10b is effectively reduced, and high purity terephthalic acid can be obtained at higher yield, by controlling the superficial gas velocity as in the above. When the superficial gas velocity is less than the lower limit of the above-specified range, the growth rate of the scales rapidly increases and the resistance to heat transfer increases, consequently rendering the temperature control difficult. Also if the superficial gas velocity is increased exceedingly, generally the hold up of the reaction liquid in reactor 1 decreases, which is undesirable because such reduces the effectively utilizable capacity of the reactor. Thus the upper limit of the superficial gas velocity is preferably 20 cm.$^3$/cm.$^2$.sec., inter alia, 10 cm.$^3$/cm.$^2$.sec., from the standpoints of ease of actual operation and economy.

Hereinafter various embodiments of the distributors useful for the invention will be explained.

The distributor may be composed of a plate 8 as illustrated in FIGS. 2a and 2b, which has a diameter equalling the inner diameter of reactor 1 and a large number of through-hole passages 9.

Also as illustrated in FIGS. 3a and 3b, the parts other than the passages of the perforated plate 8 as in FIGS. 2a and 2b may form corns projecting upwards. In this embodiment, the solid reaction product piling up on the perforated plate 8 readily slides down along the inclined planes of the corns and passes through the passages 9 to more to the bottom portion 2 of reactor 1.

Again the distributor 8 may consist of a conical plate 41 and many inclined plates 42 which concentrically surround the plate 41, as illustrated in FIGS. 4a and 4b.

Thus the shape and structure of the distributor is not critical, as long as it can pass and disperse the molecular-oxygen-containing gas upwards, and furthermore can pass the reaction liquid containing the solid reaction product. Therefore, in the distributors illustrated in the drawings, the cross-sectional configuration of the passage is not limited to a circle, but it may be a triangle, ellipse, rectangle, etc. Or, in order to improve the dispersion of the molecular-oxygen-containing gas in the main reaction zone 1a, the cross-sectional areas of the passages 9 can be varied, for example, as to the plate 8 referring to FIGS. 2a and 2b, the areas being made less at the center portion, and made greater as they approach the circumference.

Also the distributor useful for the invention may be such as illustrated in FIGS. 5a, b–7a, b, which are not only capable of passing and dispersing the molecular-oxygen-containing gas upwards and passing the reaction liquid containing solid reaction product, but also capable of themselves supplying the molecular-oxygen- containing gas into the reactor.

For example, in the embodiments illustrated in FIGS. 5a, b–7a, b, the distributor 8 is to supply the predetermined quantity of molecular-oxygen-containing gas into the main reaction zone 1a, together with the first gas sparger 6 provided at the bottom of reactor 1. Of course it is preferred to control the total quantity of the gas supply into the main reaction zone 1a from the distributor and gas sparger, to realize the above-specified superficial gas velocity.

In the distributor illustrated in FIGS. 5a and 5b, the molecular-oxygen-containing gas is supplied to the chamber 52 constituting the main body of the distributor 8 from the second gas sparger 51, and blown out downwards through the many perforations 53 into the reaction liquid in the reactor 1. The gas is combined with the molecular-oxygen-containing gas which is supplied from the bottom of reactor 1, and dispersed in the main reaction zone 1a through the passages 9. Also the reaction liquid containing the solid reaction product in the main reaction zone 1a goes down to the bottom 2 of reactor 1, through the passages 9.

The distributor 8 may be of the structure as illustrated in FIG. 5c, in which the lower surface of chamber 52 form many corns 54 projecting downwards, and the inclined sides of the corns are provided with a large number of perforations 53 for channelling the molecular-oxygen-containing gas into the reaction liquid. In that case, preferably the perforations are bored on the inclined planes of the corn-formed projections 54 in such a manner that their directions are at least inclined downwards referring to the horizontal level. Whereby the clogging of the perforations 53 by the scales of solid reaction product, etc. can be prevented.

In the distributor illustrated in FIGS. 6a and 6b, two concentric cylindrical pipes 61 and 62 are connected by two second gas spargers 51 and 51'. The molecular-oxygen-containing gas is supplied from the second gas spargers 51 and 51', through hollow connection pipes 63, to the pipes 61 and 62, and channelled downwards through the numerous perforations 53 bored on the lower surfaces of the pipes 61 and 62. Also the spaces surrounded by the four connection pipes 63 and two concentrically arranged pipes 61 and 62, as well as the inside space of the pipe 62, form the passages 9 to function similarly to the passages 9 in the embodiment of FIGS. 5a and 5b.

FIGS. 7a and 7b show still another embodiment of the distributor which can itself supply the molecular-oxygen-containing gas, in which 1' denotes the side wall of reactor 1. The distributor is composed of plural hollow pipes 7a, 7b, 7c and 7d which are horizontally inserted from the side of reactor 1 into the same reactor, each of the pipes being provided with numerous perforations 53 on the lower surface thereof. The molecular-oxygen-containing gas is supplied from the second gas sparger 51 into the hollow pipes 7a, 7b, 7c and 7d, channelled into the reaction liquid downwards through the perforations 53, and dispersed to rise into the main reaction zone 1a via the passages 9 formed between the hollow pipes 7a, 7b, 7c and 7d, and between those pipes and the side wall 1' of the reactor 1. The function of the passages 9 is the same to that of the equivalents in the embodiments of FIGS. 5a, b and 6a, b.

The manner of gas supply into the reactor 1, when the distributor is of the type which has one or more second gas spargers and can itself supply the molecular-oxygen-containing gas as illustrated in FIGS. 5a, b through 7a, b, is not critical, as long as the total quantity of the gas supplied from the first gas sparger 6 at the bottom 2 of the reactor 1 and that supplied from the second gas sparger 51 through the distributor 8 into the reactor 1, provides the afore-specified superficial gas velocity, and the molecular-oxygen-containing gas supplied from the first gas sparger can form a smooth circulation current of the reaction liquid containing the reaction product at the bottom portion 2 of the reactor 1. That is, the quantitative ratio of the gas supplied from the gas spargers 6 and 51 is not critical, as long as the foregoing conditions are met. It is preferred, however, that the gas supply from the first gas sparger is performed at such a rate as will make the superficial gas velocity in the main reaction zone 1a 0.015–20.0 cm.$^3$/cm.$^2$. sec., for the abovedescribed reasons. Furthermore, obviously it is recommendable that the molecular-oxygen-containing gas supplied from the second gas sparger through the distributor 8, as combined with the gas from the first gas sparger, should be dispersed in the main reaction zone 1a with the maximum possible uniformity.

The shape and size of the draft tube 7 provided above the entrance 6a of the first gas sparger 6 at the bottom 2 of reactor 1 are not critical, as long as it is hollow with open top and bottom, and its inner diameter and height are sufficient to form a smooth circulation current of the reaction liquid and reaction product via the tube, in the bottom portion 2 of reactor 1. Normally, the inner diameter no more than 1/3 of that of the reactor 1 but no less than 1 cm. is preferred, and the height is preferably 1–20 times the inner diameter.

Also the locations of the draft tube 7 and the first gas sparger 6 are not critical, as long as they are in the vicinity of the lower end of the bottom portion 2 of reactor 1. For the purpose of improving the circulation of reaction liquid, however, locations closest to the lower end are preferred, as long as mechanical designing permits.

As aforesaid, the shape of the draft tube 7 is not critical, as long as it allows passage of the molecular-oxygen-containing gas therethrough to perform the afore-described function. For example, perpendicular pipes not bending in the axial direction of triangular, square, or circular cross-sections can be used, cylindrical tubes being most common because of easier availability.

Also the bottom portion 2 of reactor 1 on which the draft tube 7 is provided may be of horizontal plane, conical face, conical face composed of spherical plane, etc., or may be composed of more than one of such planes, or of the pyramidal face partially substituted with curved or horizontal plane.

A structure that causes no inclination of the circulation current of reaction liquid is preferred, however, for the purpose of preventing the deposition and retardation of the solid particles on the plane.

Therefore, when a conical face is used, the vertical angle spreading upwards at the bottom of the reactor should be normally no more than 120°, preferably no more than 90°. The lower limit of the vertical angle is not critical, restricted only by the design factor. Thus, normally it is no less than 15°, preferably 30°, inter alia, 45°.

FIGS. 8 and 9 show still other embodiments for practicing the present invention.

In FIG. 8, a leg 81 with the upper end opening into the bottom 2 of reactor 1 and closed lower end is attached at the extreme lower end of bottom 2. The solid reaction product collected at the bottom 2 of reactor 1 goes further down into the leg 81, to be withdrawn from the exit of the reaction product provided at the lower portion of leg 81 together with the reaction liquid, in the form of a slurry of still higher solid content.

Furthermore, when an inlet pipe 82 is attached at a suitable position around the lower end of leg 81, and through which a liquid reaction medium or an aqueous solution thereof is supplied into the leg 81, the solid reaction product is back washed rinsed in leg 81 as the reaction liquid coming down into leg 81 together with the solid reaction product is substituted with the new reaction medium supplied from the inlet pipe 82. Thus the impurity content of the terephthalic acid to be withdrawn from the reactor can be reduced, and the purity of the terephthalic acid is markedly improved. Not only that, the above device is useful to reduce the loss of valuable materials such as the catalyst and intermediate reaction products. Furthermore, there is still another advantage in that the conversion to terephthalic acid can be further improved, since the intermediate reaction products return into the reactor 1 due to the back wash, to be further oxidized.

Incidentally, the mounting position of leg 81 is not necessarily the extreme lower end of the bottom 2 of reactor 1, but may be at any location in the vicinity thereof. Also the direction of leg may be perpendicular, or somewhat inclined.

The preferred capacity of the leg ranges 1/100–1/10 of that of the reactor 1, the inner diameter thereof being no more than 1/2 that of the reactor and no less than 5 cm., and the length being no less than twice the inner diameter of the leg and no more than 1/2 the depth of the reaction liquid (L) in the reactor 1.

The quantity of the rinse liquid to be supplied into leg 81 from the inlet pipe 82, which is mountable at any position of the leg but below 1/2 of the height thereof, is determined in consideration of the impurity content of the terephthalic acid to be withdrawn, economy of the apparatus and process, and other technical considerations. The impurity content of the terephthalic acid in turn is determined by such factors as the quantity of the solid reaction product to be treated, operation system such as continuous or intermittent, capacity of the reactor 1, terephthalic acid concentration in the slurry to be withdrawn, liquid substitution efficiency in the leg 81, and particle size of the terephthalic acid in the leg 81. Normally, however, the appropriate quantity of the rinse liquid ranges equivalent to 5 times that of the mother liquor of the slurry to be withdrawn.

The vertical level order of the exit 4 for the reaction product and the inlet pipe 82 at the lower half of leg 81 is not critical.

Again the liquid reaction medium for rinsing to be supplied into leg 81 from the inlet pipe 82 is preferably of the identical type with that supplied into the reactor 1 through the material feed pipe 5, or an aqueous solution thereof. In the latter case, the appropriate water content is 50% or below, preferably 20%, inter alia, 10% or below.

Also as the liquid reaction medium or an aqueous solution thereof to be supplied from the inlet pipe 82 to leg 81, a part or total of the condensation liquid obtained by condensing the condensable component carried with the exhaust gas discharged from the exhaust pipe 3 attached at an upper part of the reactor 1 may be used.

Thus, the provision of leg 81 at a lower portion of bottom 2 of the reactor 1, and the provision of an inlet pipe 82 for supplying the liquid reaction medium for rinsing into the leg 81 produce very favorable results.

The temperature inside the leg 81 during the rinsing operation is not critical. However, under certain withdrawal rate of the slurry mixture from, and supply rate of the rinse liquid to, the leg 81, a considerable range of temperature distribution is caused within the leg 81, which may cause adhesion of scales on the inner walls of leg 81, or on the walls in the vicinity of withdrawal valve and inlet pipe 82. Accordingly, it is desirable to control the temperature of the rinse liquid to be supplied from the pipe 82 in advance, to approximately the same to that of the reaction liquid, for example, 80–150° C., by means of a pre-heater, etc.

In the embodiment shown in FIG. 9, a temperature controlling system for maintaining the reaction liquid in the reactor at the predetermined reaction temperature is provided on an apparatus which is substantially the same to that illustrated in FIG. 1.

The construction and the manner of operation of the temperature controlling system are as follows.

Referring to FIG. 9, water is introduced into the heating and cooling jacket 10b mounted outside the reactor 1 and the heat transfer tubes 10a through the pipe 94, up to the predetermined water level in the upper main header 92 which serves to separate vapor from liquid as well as to maintain a constant liquid level. The heat transfer tubes 10a are perpendicularly inserted in the reactor 1. Into the lower main header 93, steam is introduced from the pipe 98. In case of heating the reaction liquid, the steam remaining unconsumed after the heating of the reaction liquid in the jacket 10b and tubes 10a is separated into liquid and vapor phases in the pipe 92, and during the cooling time to remove the reaction heat, the steam formed by the evaporation of water in the jacket 10b and tubes 10a caused by the reaction heat, is similarly vapor-liquid separated in the header 92. The resultant steam is introduced into the vapor drum 91 through the pipe 99, at which the entrained liquid particles are further separated. The steam is subsequently discharged through the pipe 100. The entrained liquid particles and the water supplied into the vapor drum 91 through the pipe 94 return to the header 92 via the pipe 98.

Also in order to always keep the jacket 10b and heat transfer tubes 10a full with water, the liquid level of the header 92 is maintained constant. When the level rises, the excessive water is supplied to vapor drum 91 from the pipe 97. The water in the pipe 92 also goes down through the pipe 96 to the pipe 93, and re-enters into the jacket 10b and heat transfer tubes 10a. Thus a natural circulation is performed. The numerals 101 and 102 resectively denote the connection pipe of the pipe 93 with the jacket, and that of the pipe 92 with the jacket.

When such a temperature controlling system is provided, at the initiation of the operation water is filled to the vapor-liquid separation level of the pipe 92, and steam of the temperature higher than the reaction temperature is introduced into that water from the lower pipe 98, in order to heat the reaction liquid in the reactor to the predetermined reaction temperature. When that temperature is reached, the reaction material is fed into the reactor at a rate as will maintain the liquid level 11 constant, and the corresponding quantity of the reaction product is withdrawn from the exit 4, either continuously or intermittently.

Since the reaction is exothermic, removal of excessive heat may become necessary as the reaction is continued. In that case, the valve 100' on the pipe 100 is controlled to change the steam pressure in the drum 91. Whereupon the steam supplied through the pipe 98 is cooled to the saturation point of itself, and due to the phenomenon of latent heat of vaporization, the excessive heat is removed in the process of steam formation. Therefore the transfer from the heating to cooling is very smoothly performed, and the temperature variation is very quickly restored to the constant level. Normally the steam may be constantly supplied from the pipe 98 without an detrimental effect on the temperature control, but from the standpoint of heat economy, it is preferred to control the quantity of the steam by means of a valve.

Also when the reaction transfers from the cooling side to the heating side or vice versa during the normal state, due to any external disturbance (e.g., pumping mistake of the liquid containing p-dialkylbenzene), the pressure in the vapor drum 91 rises or falls depending on the individual situation to cause steam heating, or cooling by latent heat of vaporization of water, and consequently maintains the reaction temperature at a precisely constant level.

Obviously the above temperature controlling system is operable with the use of a suitable liquid and vapor thereof other than water and steam, depending on the reaction temperature selected.

Thus, the temperature controlling system as illustrated in FIG. 9 can be used to practice the subject method smoothly and continuously at a predetermined constant temperature level.

The subject method can be satisfactorily practiced with single apparatus in accordance with the invention, but it is likewise possible to combine more than one of such apparatuses in series. That is, the reaction liquid containing solid terephthalic acid which is withdrawn from the exit at a lower part of the first reactor may be directly fed into the material feed pipe of the second reactor, to be subjected with the invention. Such operation can be repeated more than once, and whereby high purity terephthalic acid can be obtained at high yields.

For the recovery of terephthalic acid from the reaction mixture obtained in accordance with the invention, any known solid-liquid separation means is applicable. That is, by such conventional means as filtration, centrifugal filtration and centrifugal sedimentation, the mother liquor and terephthalic acid in the reaction mixture can be separated. The operation temperature for the terephthalic acid separation is preferably within the range of 50° C. to the boiling point of the liquid reaction medium at normal pressure. The recovered crude terephthalic acid may be used as it is, or further purified.

So far the particulars of the invention have been explained referring to FIGS. 1 though 9, but for an even clearer understanding of the invention, an example of entire operation system of the subject process is illustrated in FIG. 10 as a flow sheet.

Referring to FIG. 10, first the flow will be explained to the reaction product. Each predetermined quantity of p-dialkylbenzene, liquid reaction medium (acetic acid in this specific case for explanation), and a heavy metal catalyst (cobalt acetate in this specific example) is respectively fed from the pipes 103, 104 and 105, into the starting material preparation tank 106, and from which the starting mixture is continuously sent into the reactor 1 at a predetermined rate. In the reactor 1, a molecular-oxygen-containing gas (air in this specific example) is supplied from the lower portion thereof through the first gas sparger 6 and second gas sparger 51, from a gas holder 141. Thus the reaction materials and air are intimately contacted in the reactor 1 as described referring to FIGS.

1 through 9, to perform the object oxidation reaction under the predetermined reaction conditions.

The slurry-formed reaction product withdrawn from the exit 4 at the bottom portion of reactor 1 is separated from the mother liquor contained in the reaction product at the solid-liquid separator 107, and the solid component, i.e., crude terephthalic acid, enters into the washing vessel 110 via the pipe 108, to be washed with acetic acid. The acid is further sent to another solid-liquid separator 113 via the pipe 111 to be separated from the washing, and the solid, cleaned terephthalic acid is sent to a dryer 116 through the pipe 114, dried, withdrawn from the pipe 117, and optionally further refined.

The oxidation filtrate and washing filtrate each separated at the solid-liquid separators 107 and 113 are supplied to a distillation column 122, respectively through the pipe 109 and 115. Acetic acid and cobalt acetate used as the catalyst are recovered from the pipe 132 attached at a lower part of the distillation column 112, which are recycled into the aforesaid starting material preparation tank 106, through the pipe 133. From a lower part of the distillation column 122, acetic acid or that containing water is recovered through the pipe 136 in the form of vapor, which is cooled and condensed at the condenser 138 and recycled into the washing vessel 110 through the pipe 139.

Also the vapor of acetic acid which may contain water, withdrawn from the dryer 116 through the pipe 118 is cooled and condensed at the condenser 119, and similarly recycled into the washing vessel 110 through the pipe 120.

At the bottom of the distillation column 122, a reboiler 135 is equipped, and a part of the acetic acid withdrawn via the pipe 132 is sent to the reboiler 135 through the pipe 134, to be evaporated therein and recycled into the distillation column 122.

Also p-dialkylbenzene and water in the vapor form are sent from the top of the distillation column 122 to the condenser 124 through the pipe 123, to be cooled and condensed.

Thus condensed p-dialkylbenzene and water are sent from the condenser 124 to a decanter 126 through the pipe 125, and in which the p-dialkylbenzene is separated from water as two different phases. The p-dialkylbenzene is recycled into the starting material preparation tank 106, through the pipe 127.

According to the present invention, p-dialkylbenzene is not substantially contained in the oxidation filtrate, and so the amount of p-dialkylbenzene to be separated by decanter 126 is so small as will not substantially affect the yield of terephthalic acid. But p-dialkylbenzene can be further recovered to use it effectively.

The water forming the bottom phase in the decanter 126 is discharged outside the reaction system, through the pipe 131.

As aforesaid, in the reactor 1 the object oxidation is continued under the predetermined reaction conditions, and the exhaust gas after the reaction is sent to the reflux condenser 142 through the pipe 3.

In the reflux condenser 142, the exhaust gas is cooled, and p-dialkylbenzene and a part of acetic acid carried by the gas are condensed. The exhaust gas is sent to the condenser 144 through the pipe 143. Thus the p-dialkylbenzene and acetic acid remaining in the gas are further condensed at the condenser 144, and the gas is sent to a gas-liquid separator 146 through the pipe 145. Whereas the condensation products are separated. The remaining gas further enters into the lower portion of an absorber 149, through the pipe 148. To the upper part of this absorber 149, a part of the water separated at the decanter 126 is supplied through the pipe 130, so that the exhaust gas supplied from the pipe 148 is contacted with the water supplied from the pipe 130, to cause the absorption of acetic acid in the gas into the water. If the exhaust gas still contains p-dialkylbenzene, another absorbing device can be provided, so that the p-dialkylbenzene may be absorbed into, for example, acetic acid or aqueous solution thereof, before sending the exhaust gas to the aforesaid absorber 149. The exhaust gas is discharged into the air from the top of the absorber 149, and the residue is supplied to the distillation column 122 through the pipe 151.

Also the p-dialkylbenzene and acetic acid condensed at the reflux condenser 142 flow backwards through the pipe 3 to be recycled into the reactor 1. The condensation product comprising p-dialkylbenzene and acetic acid formed in the condenser 144 enters into the gas-liquid separator 146 through the pipe 145, and wherein the condensation product is separated from the exhaust gas and returned into the reactor 1.

Using the apparatus of the subject invention in the series of the operation system as described in the above, high purity terephthalic acid can be continuously obtained at surprisingly high yield, consuming little acetic acid and very effectively recycling the catalyst.

As the starting material of terephthalic acid preparation to which the subject apparatus and method are applicable, p-dialkylbenzenes such as p-xylene, p-cymene and intermediate oxidation products of p-dialkylbenzenes such as p-toluic acid 4-carboxybenzaldehyde, etc. or the mixtures of the foregoing, may be used, the most preferred being p-xylene.

As the molecular oxygen or molecular-oxygen-containing gas used for the oxidation of above starting materials, pure oxygen or mixtures of oxygen with inert gases such as nitrogen, argon, carbon dioxide, etc. can be used, air being the most easily available gas for this purpose.

According to the invention, the oxidation of the starting materials as named in the above with molecular-oxygen-containing gas is performed in a liquid reaction medium. As the liquid reaction medium, aliphatic monocarboxylic acids of 2-4 carbons such as acetic, propionic, and butyric acids, are used with preference, acetic acid being the most preferred.

The oxidation is also performed in the presence of a heavy metal catalyst in accordance with the invention. As the heavy metal catalyst, compounds of cobalt, manganese, silver, molybdenum, niobium, etc., particularly organic acid salts such as acetate of such metals are useful. The compounds of cobalt, manganese, etc. can also contain minor quantities of other metallic compounds, such as the compounds of scandium, yttrium, lanthanum, neodymium, gadolinium, thorium, zirconium, hafnium, etc. It is also permissable in this invention to promote the oxidation reaction with the concurrent use of promoting or initiating agents such as bromine compound, e.g., ammonium bromide, methylenic ketone aldehyde, ozone ($O_3$), etc., with the above metallic compound catalyst.

In the above, particularly preferred catalysts are the cobalt compounds which are soluble in the aforesaid aliphatic monocarboxylic acid solvent of 2-4 carbons, for example, organic acid salts of cobalt such as cobalt acetate.

In practicing the subject method, the reaction temperatures is not critical as long as it permits oxidation of p-dialkylbenzene in the aliphatic monocarboxylic acid solvent, in the presence of the heavy metal catalyst, with molecular-oxygen-containing gas to form terephthalic acid. Normally, however, it is within the range of 80°–150° C., particularly 90°–140° C. At temperatures below the lower limit of the above-specified range, the terephthalic acid cannot be obtained at substantially high yields, and at temperatures above the upper limit, neither the high yields are expected and furthermore combustion of the aliphatic monocarboxylic acid as the solvent, as oxidized by the molecular-oxygen-containing gas takes place.

The pressure inside the reactor may range from atmospheric to 100 atmospheres, preferably atmospheric to 50 atmospheres.

In practicing the subject method, it is desirable to measure the concentration of molecular oxygen in the gas at the gas phase in the upper portion of the reactor, and to perform the oxidation while diluting the gas in the gas phase with an inert gas or gases, or controlling the supply rate of the molecular-oxygen-containing gas, so as to prevent the composition of the gas from becoming explosive, for the purpose of securing safe operation.

According to the present invention, a conversion product from p-dialkylbenzene is substantially terephthalic acid or an intermediate oxidation product to be converted into terephthalic acid. Therefore, by recycling and oxidizing a mother liquor containing such terephthalic acid at an extremely high yield.

Hereinafter the invention will be explained with reference to the working examples, which however should not be construed to limit the scope of this invention in any sense.

In the examples, parts and percentages are by weight, unless specified otherwise. Also the yields of terephthalic acid are one pass yield of the p-dialkylbenzene fed in the reactor 1, expressed by mol percent.

EXAMPLES 1–7

A stainless steel pressure reactor of the structure as illustrated in FIG. 1 was employed, the particulars of the structure being as follows: the reactor was connected to a condenser at the top, through a reflux condenser; the vertical angle of the reactor bottom was 60°, and the reactor was provided with a single-nozzle first gas sparger, a draft tube thereabove, a gas distributor of the construction as illustrated in FIG. 4, which was located above the draft tube, a material feed pipe, four sampling boxes distributed along the perpendicular direction of the reaction column so that the hole-up liquid in the column may be sampled at the various levels, and three sight glasses to allow observation of the reactor's hold up from outside. The ratio of the inside diameter to the height of the column was 17. The position of the material feed pipe was variable as 20 cm. higher than the liquid level, and such that as will make $l/L$ ⅛, ¼, ⅓, ½, and ¾, L being the distance from the first gas sparger to the reaction liquid level in the column, and $l$ being the distance from the reaction liquid level to the material feed pipe.

The above reactor was charged with 144.7 parts of acetic acid and 22.3 parts of cobalt acetate tetrahydrate [Co(OAc)$_2$·4H$_2$O], and air was supplied into the draft tube from the first gas sparger, at such a rate to make the superficial air velocity 1.73 cm.$^3$/cm.$^2$.sec. While maintaining the pressure inside the system as detected at the pressure detecting element 13 in FIG. 1 at the predetermined values as indicated in Table 1, warm water was filled into the reactor jacket and cooling tubes which were inserted perpendicularly into the reactor, up to the gas-liquid separation level. Then the system was heated by passing 3.0 kg./cm.$^2$.G of steam from the bottom of the jacket. When the inside temperature as detected at the temperature detector in FIG. 1 reached the values indicated in Table 1, a starting reaction mixture consisting of 11.75% of p-xylene, 76.50% of acetic acid, and 11.75% of cobalt acetate tetrahydrate

[Co(OAc)$_2$·4H$_2$O]

was supplied into the reactor continuously, at the rate of 20.9 parts per hour, from the material feed pipe located at various levels to alter $l/L$ as indicated in Table 1. Simultaneously therewith, the reaction product of the quantity corresponding to that of the material supply was continuously withdrawn from the exit at the bottom portion of the reactor, while the liquid level in the reactor was maintained constant. Approximately 40 hours after initiation of the reaction, the reaction state was steady, and the operation was further continued under the above-specified conditions. The results are given also in Table 1.

TABLE 1

| Example number | Reaction conditions | | | Terephthalic acid yield (mol percent) |
|---|---|---|---|---|
| | Temp. (° C.) | Pressure (kg./cm.².G) | $l/L$ | |
| 1 | 120 | 10 | ¼ | 80.1 |
| 2 | 120 | 15 | ¼ | 82.3 |
| 3 | 120 | 20 | ¼ | 84.8 |
| 4 | 120 | 20 | ½ | 84.6 |
| 5 | 130 | 10 | ⅓ | 80.3 |
| 6 | 130 | 15 | ¼ | 82.5 |
| 7 | 130 | 20 | ¼ | 84.7 |

Controls 1–4

A reaction was performed similarly to Examples 1–7, at the reaction temperature of 120° C., pressure of 20 kg./cm.².G, and with the material supply position $l/L$ varied as in Table 2. The results are also given in Table 2.

TABLE 2

| Control number | $l/L$ | Terephthalic acid yield (mol percent) |
|---|---|---|
| 1 | (¹) | 73.4 |
| 2 | ⅛ | 79.1 |
| 3 | ½ | 79.8 |
| 4 | ¾ | 75.0 |

¹ Higher than the liquid level by 20 cm.

EXAMPLES 8–14

The reaction as in Examples 1–7 was repeated, except that the second gas sparger having perforations opening downwards was used as the gas distributor, and the air was supplied into the draft tube from the first gas sparger at a superficial air velocity of 1.73 cm.³/cm.².sec., and the rest of the air was supplied from the second gas sparger above the draft tube. The $l/L$ was set to be ¼, and the reaction temperature and pressure were varied in each run as in Table 3. The results are given in the same table.

TABLE 3

| Example number | Reaction conditions | | | Terephthalic acid yield (mol percent) | Composition of reaction product (percent) | |
|---|---|---|---|---|---|---|
| | Temp. (° C.) | Pressure (kg./cm.².G) | G1¹ | | Terephthalic acid | 4-carboxy-benzaldehyde |
| 8 | 120 | 10 | 0.3 | 81.3 | 84.3 | 1.85 |
| 9 | 120 | 15 | 0.3 | 83.2 | 85.1 | 1.79 |
| 10 | 120 | 20 | 0.3 | 85.2 | 86.1 | 1.79 |
| 11 | 120 | 20 | 0.4 | 85.8 | 86.3 | 1.78 |
| 12 | 120 | 20 | 0.8 | 84.9 | 85.8 | 1.76 |
| 13 | 120 | 20 | 1.0 | 84.5 | 85.6 | 1.78 |
| 14 | 130 | 20 | 0.3 | 85.4 | 86.2 | 1.81 |

¹ Superficial air velocity in the column to be supplied from the first gas sparger (cm.³/cm.².sec.).

During the operation, the dispersion of air bubbles was observed from the sight glasses on the reactor. In all examples the air dispersion was satisfactory as observed from all of the three sight glasses (0.0024L, 0.359L, 0.892L). In the vicinities of the sight glasses, evenly dispersed groups of air bubbles were observed.

Again during the procedures of Example 10, the hold-up liquid in the column was sampled from the four sampling holes on the reactor, and the samples were determined of the slurry concentrations. The results are given in Table 4. Incidentally, the positions of the sight glasses and sampling boxes are expressed as measured from the reaction liquid level in the column, with reference to the length L which is the distance between the liquid level and the first gas sparger.

TABLE 4

| Position of sampling box | Slurry concentration (percent) | Remarks |
|---|---|---|
| 0.217L | 8.6 | |
| 0.678L | 8.8 | |
| 0.928L | 17.6 | Second gas sparger. |
| ≃1.00L | 18.2 | First gas sparger. |

Thus, below the second gas sparger, no abrupt variation in slurry concentration was observed, and in the zone below the the second gas sparger which was above the draft tube, the crude terephthalic acid particles were uniformly suspended.

Control 5

A reaction was performed in the manner similar to Examples 8–14, except that no air was supplied from the first gas sparger, i.e., no air was blown into the draft tube, but air was supplied from the second gas sparger above the draft tube, at a superficial air velocity in the column of 1.73 cm.$^3$/cm.$^2$.sec., at a reaction temperature of 120° C. and pressure of 20 kg./cm.$^2$.G. The results are given in Table 5.

Thus in the zone below the second gas sparger, abrupt change in slurry concentration was observed, the zone becoming, so to speak, a dead space. Therefore in that zone no contact between the crude terephthalic acid particles and air was brought about and after two weeks from the initiation of the reaction the exit of the reaction product was clogged with the deposit of the product. Thus stable operation over prolonged period was impossible.

Controls 6

Control 3 was repeated except that no air was supplied from the second gas sparger, but from the first gas sparger under the draft tube, air was supplied at a superficial air velocity in the column of 1.73 cm.$^3$/cm.$^2$.sec. The resultant resultant terephthalic acid yield was 75.2 mol percent.

During the operation the dispersion of air bubbles was observed through the sight glasses on the reactor. In the vicinities of 0.0024L and 0.359L sight glasses, the state of dispersion was satisfactory and even spread bubble groups were observed. However at around the 0.892L sight glasses, little bubbles were observed, and vertical dispersion along the reactor of the bubbles was uneven.

EXAMPLES 15–21

Examples 8–14 were repeated except the following changes: the reaction temperature was 120° C.; pressure was 20 kg./cm.$^2$ G; the position of the material feed pipe l/L, was ¼; the superficial air velocity supplied from the first gas sparger was 0.3 cm.$^3$/cm.$^2$ sec.; and the rest of the air was supplied through the second gas sparger to make the superficial velocity of the total air as indicated in Table 6 below. The results are also given in the same table.

TABLE 6

| | Material supply | | Reaction conditions | | Scale growth rate (mm./hr.) | Production rate of terephthalic acid (part/hr.) | Therephthalic acid yield (mol percent) | Composition of reaction product (percent) | |
|---|---|---|---|---|---|---|---|---|---|
| Example number | Acetic acid (part) | Cobalt acetate tetrahydrate (part) | Liquid supply (part/hr.) | Superficial air velocity (cm.$^3$/cm.$^2$ sec.) | | | | Terephthalic acid | 4-carboxy-benzaldehyde |
| 15 | 155.1 | 24.0 | 22.5 | 0.80 | 0.0045 | 3.37 | 81.3 | 84.3 | 1.83 |
| 16 | 153.4 | 23.6 | 22.1 | 1.04 | 0.0041 | 3.35 | 82.4 | 84.7 | 1.81 |
| 17 | 150.8 | 23.2 | 21.7 | 1.27 | 0.0022 | 3.21 | 80.2 | 83.7 | 1.80 |
| 18 | 148.2 | 22.8 | 21.3 | 1.50 | 0.0022 | 3.32 | 84.4 | 85.6 | 1.77 |
| 19 | 144.7 | 22.3 | 20.9 | 1.73 | 0.0022 | 3.28 | 85.2 | 86.1 | 1.79 |
| 20 | 128.2 | 19.7 | 18.7 | 3.00 | 0.0022 | 2.92 | 84.6 | 85.7 | 1.78 |
| 21 | 70.8 | 10.9 | 10.2 | 7.00 | 0.0022 | 1.53 | 83.1 | 85.1 | 1.74 |

Control 7–8

A reaction was performed in the manner similar to Examples 15–21, except that the experimental conditions were varied as in Table 7 below. The results are also given in the same table.

TABLE 7

| | Material supply | | Reaction conditions | | Scale growth rate (mm./hr.) | Production rate of terephthalic acid (part/hr.) | Therephthalic acid yield (mol percent) | Composition of reaction product (percent) | |
|---|---|---|---|---|---|---|---|---|---|
| Example number | Acetic acid (part) | Cobalt acetate tetrahydrate (part) | Liquid supply (part/hr.) | Superficial air velocity (cm.$^3$/cm.$^2$ sec.) | | | | Terephthalic acid | 4-carboxy-benzaldehyde |
| 7 | 159.5 | 24.5 | 23.0 | 0.56 | 0.0510 | 2.39 | 66.3 | 73.2 | 2.53 |
| 8 | 156.9 | 24.1 | 22.6 | 0.70 | 0.0190 | 2.51 | 60.1 | 75.2 | 2.41 |

TABLE 5

| Position of sampling box | Slurry concentration (percent) | Remarks |
|---|---|---|
| 0217L | 8.7 | |
| 0.678L | 8.8 | |
| 0.928L | 12.2 | Second gas sparger. |
| ≃1.00L | 18.1 | First gas sparger. |

During the experiments, temperature control became difficult due to the adhesion of scales, and stable operation over prolonged period was impossible.

EXAMPLES 22–25

Example 19 was repeated except that the position of material feed pipe l/L was made ⅓. The results are given in Table 8.

TABLE 8

| Example number | Material supply | | Reaction conditions | | Scale growth rate (mm./hr.) | Production rate of terephthalic acid (part/hr.) | Therephthalic acid yield (mol percent) | Composition of reaction product (percent) | |
|---|---|---|---|---|---|---|---|---|---|
| | Acetic acid (part) | Cobalt acetate tetrahydrate (part) | Liquid supply (part/hr.) | Superficial air velocity (cm.³/cm.² sec.) | | | | Terephthalic acid | 4-carboxy-benzaldehyde |
| 22 | 153.4 | 23.6 | 22.1 | 1.04 | 0.0042 | 3.34 | 82.1 | 84.6 | 1.82 |
| 23 | 148.2 | 22.8 | 21.3 | 1.50 | 0.0022 | 3.29 | 84.0 | 85.6 | 1.77 |
| 24 | 128.2 | 19.7 | 18.7 | 3.00 | 0.0022 | 2.91 | 84.3 | 85.8 | 1.79 |

EXAMPLE 26

Example 19 was repeated except that, as the initial material supply, a mixture consisting of 130.0 parts of acetic acid, 4.73 parts of cobalt acetate tetrahydrate $$[Co(OAc)_2 \cdot 4H_2O]$$

and 13.47 parts of methyl ethyl ketone was fed, and as the starting material, a mixture consisting of 11.9 wt. percent of p-xylene, 77.2 wt. percent of acetic acid, 2.8 wt. percent of cobalt acetate tetrahydrate, and 8.1 wt. percent of methyl ethyl ketone was supplied. Also the reaction temperature was set to be 135° C. The terephthalic acid yield was 82.4 mol percent.

EXAMPLES 27-28

Example 19 was repeated except that air containing 0.5 vol. percent of ozone was used as the molecular-oxygen-containing gas, and that the reaction temperature was varied as in Table 9 below. The results are given in the same table.

TABLE 9

| Example number | Reaction temp. (° C.) | Terephthalic acid yield (mol percent) |
|---|---|---|
| 27 | 105 | 80.5 |
| 28 | 120 | 85.2 |

EXAMPLE 29

Example 19 was repeated except that, as the initial liquid supply, a liquid mixture consisting of 133.4 parts of acetic acid, 4.24 parts of cobalt acetate tetrahydrate, and 10.23 parts of acetaldehyde was fed, and as the starting material, a mixture consisting of 10.84 wt. percent of p-xylene, 80.4 wt. percent of acetic acid, 2.56 wt. percent of cobalt acetate tetrahydrate [Co(OAc)$_2$·4H$_2$O] and 6.2 wt. percent of acetaldehyde was supplied into the reactor. Performing the reaction at 115° C., 82.8 mol percent of terephthalic acid yield was obtained.

EXAMPLE 30

Example 19 was repeated except that, as the initial material supply, a liquid mixture consisting of 123.7 parts of acetic acid, 4.75 parts of cobalt acetate tetrahydrate, and 0.48 part of zirconium acetate [ZrO(OAc)$_2$·$n$H$_2$O] was fed, and as the starting material, a liquid mixture consisting of 12.86 wt. percent of p-xylene, 83.61 wt. percent of acetic acid, 3.21 wt. percent of cobalt acetate tetrahydrate, and 0.32 wt. percent zirconium acetate was supplied into the reactor. Performing the reaction under a pressure of 10 kg./cm.² G, 85.2 mol percent of terephthalic acid yield was obtained.

EXAMPLE 31

Example 19 was repeated except that the acetic acid was replaced by propionic acid. The resultant terephthalic acid yield was 83.2 mol percent.

EXAMPLES 32-34

A reactor as illustrated in FIG. 7, which had a cylindrical leg attached to the bottom thereof was employed. The leg had an inner diameter which was one-third that of the reactor, and a length of five times that of the inner diameter. As the initial material supply, a mixture consisting of 128.2 parts of acetic acid and 19.7 parts of cobalt acetate tetrahydrate was fed, and air was supplied through the first gas sparger at a superficial air velocity in the reactor of 0.3 cm.³/cm.² sec. The rest of air was supplied from the second gas sparger at such a rate to make the superficial velocity of the total air in the column 3.0 cm.³/cm.² sec. At the reaction temperature of 120° C. and pressure of 10 kg./cm.² sec., a starting material of the composition as indicated in Table 10 was supplied at a rate specified in the same table, through the material feed pipe located at $l/L$ of ¼.

Simultaneously therewith, a portion of the condensation liquid of the exhaust gas from the reactor, which was condensed in the condenser connected at the top of the reactor, was pre-heated to 110° C. with a pre-heater, and supplied into the bottom portion of the leg as the rinse liquid, at the rate indicated in Table 10. The remainder of the condensation liquid was refluxed to the top portion of the reactor. Thus the liquid substitution due to the rinsing was performed in the leg, and from the bottom portion of the leg, the content of the reactor in the quantities corresponding to the material supply was discharged intermittently.

Under the foregoing reaction conditions, the reaction was steady state after approximately 40 hours, and from the exit of the reaction product provided in the leg, the reaction product of the quantity corresponding to that of the starting liquid mixture, which was concentrated to a solid content of approximately 45%, was regularly withdrawn.

During the continuous reaction procedure under the foregoing conditions, the composition of the reaction liquid in the reactor was approximately as follows: p-xylene and its oxidation products calculated as p-xylene:acetic acid:cobalt acetate correspond to 20:130:20. The terephthalic acid yields, composition of the reaction products, and the quantities of cobalt acetate tetrahydrate contained in the crude terephthalic acid obtained by separating and drying the reaction products, are also given in Table 10.

The catalyst contents given in Table 10 are the parts of the catalyst contained in 100 parts of crude terephthalic acid, calculated as cobalt acetate tetrahydrate.

TABLE 10

| Example number | Composition of reaction liquid (wt. percent) | | | Liquid supply (part/hr.) | Rinse liquid supply (part/hr.) | Terephthalic acid yield (mol percent) | Composition of reaction product (wt. percent) | | Catalyst content [1] |
|---|---|---|---|---|---|---|---|---|---|
| | p-Xylene | Acetic acid | Cobalt acetate Tetrahydrate | | | | Terephthalic acid | 4-carboxy-benzaldehyde | |
| 32 | 36.7 | 56.8 | 6.5 | 4.59 | 4.20 | 87.9 | 87.3 | 1.80 | 2.17 |
| 33 | 37.1 | 54.2 | 8.7 | 4.71 | 3.18 | 85.2 | 86.1 | 1.81 | 3.21 |
| 34 | 37.1 | 51.5 | 11.4 | 4.87 | 2.10 | 84.0 | 85.6 | 1.83 | 3.81 |

[1] Part/100 parts of crude terephthalic acid.

EXAMPLES 35-36

Example 34 was repeated except the following changes: as the rinse liquid, acetic acid or aqueous acetic acid solution as specified in Table 11 was supplied at a rate of 2.10 parts per hour; and, as the starting material, a mixture consisting of 57.4 wt. percent of p-xylene, 24.8 wt. percent of acetic acid, and 17.8 wt. percent of cobalt acetate tetrahydrate was fed into the reactor at a rate of 3.83 parts per hour. The results are given in Table II below.

TABLE 11

| Ex. No. | Acetic acid content of rinse liquid (percent) | Terephthalic acid yield (mol percent) | Composition of reaction product (wt. percent) | | | Catalyst content [1] |
|---|---|---|---|---|---|---|
| | | | Terephthalic acid | 4-carboxy-benzaldehyde | | |
| 35 | 100 | 84.4 | 85.6 | 1.83 | | 3.84 |
| 36 | 90 | 84.1 | 85.4 | 1.83 | | 3.81 |

[1] Part/100 parts of crude terephthalic acid.

EXAMPLE 37

Example 20 was repeated at the reaction pressure of 10 kg./cm.$^2$ G, in which the catalyst and the liquid medium were recycled in accordance with the flow sheet of FIG. 10.

That is, the starting material of the reaction was continuously supplied into the reactor, and the corresponding quantities of the content of the reactor was continuously withdrawn from the exit of the reaction product at the bottom of the reactor while maintaining a constant liquid level. Crude terephthalic acid and oxidation filtrate were separated from the reaction product by means of centrifugal separation at 80° C. The crude terephthalic acid was washed for 20 minutes at 80° C. with acetic acid of the water content of 10%, and subsequently separated into the washed terephthalic acid and washing filtrate, by means of centrifugal separation at 80° C. Thus washed terephthalic acid was further dried in a dryer.

Because the oxidation and washing filtrates contained water which was formed by the oxidation reaction, besides the acetic acid used as the solvent, cobalt acetate used as the catalyst, and intermediate oxidation products such as p-toluic acid, 4-carboxybenzaldehyde, etc., water in an amount corresponding to that formed by the reaction was removed by distillation under a reduced pressure of 250 mm. Hg. The remaining filtrates were recycled for the use in the reaction and washing. That is, thus the side-cut liquid of the distillation column, and the liquid mixture to be used for the washing with the acetic acid containing 10 wt. percent of water which was recovered at the dryer, were prepared.

Furthermore, from the bottom of the distillation column, the bottom which was dehydrated to a water content of approximately 3.5 mols $H_2O/Co$. atom was continuously withdrawn. p-Xylene and acetic acid was replenished into the bottom to make its composition identical with that of the starting material employed in Example 20, and the composition was recycled into the reactor.

Also the exhaust gas which was condensed in the reflux condenser and condenser, and furthermore separated from the condensation products by a gas-liquid separator, was subjected to gas absorption operations under elevated pressure. Whereupon the p-xylene and acetic acid contained in the exhaust gas were recovered respectively with acid and the water of distillate from the distillation column.

That is, the distillation tower consisted of two columns. The exhaust gas separated from the condensation products was introduced into the bottom of the first column, and substantially 100% concentration acetic acid was introduced from the top of the first absorption column. The bottom containing p-xylene was absorbed by the acetic acid in the first column, and together supplied to the starting material preparation tank. The gas discharged from the first absorption column was introduced into the bottom of the second absorption column, while a part of the distillate of the distillation column which was substantially water was supplied from the top thereof. The bottom of the second column which contained acetic acid as absorbed by water was fed into the distillation column together with the aforesaid oxidation and washing filtrates. The exhaust gas from the second column was discharged in the atmosphere as it was.

The operation was continued for a month under the foregoing conditions. The quantities of thus obtained dry terephthalic acid, p-xylene supply, and the acetic acid added to the system to offset the loss, are given in Table 12 below.

TABLE 12

| Supply from outside of the system | | Withdrawal to outside of the system | |
|---|---|---|---|
| Substance | Quantity (part/month) | Substance | Quantity (part/month) |
| p-Xylene | 1,582 | Dry terephthalic acid | 2,430 |
| Acetic acid | 51.2 | | |
| Cobalt acetate tetrahydrate | | | |

In the meantime, loss of the cobalt acetate was substantially nil.

We claim:

1. A method for the preparation of terephthalic acid from p-dialkylbenzene or an intermediate oxidation product thereof, which comprises reacting p-dialkylbenzene or intermediate oxidation product thereof with molecular oxygen or molecular oxygen-containing gas in an aliphatic monocarboxylic acid solvent of 2-4 carbon atoms as the reaction medium in the presence of a heavy metal oxidation catalyst, in a reactor having a downwardly tapered bottom, a gas sparger, a draft tube, a gas distributor and a starting material inlet, above the distributor for feeding the dialkylbenzene or intermediate oxidation product, the method being characterized by the following features:

(1) the molecular oxygen or molecular oxygen-containing gas is dispersed in the reaction liquid by gas sparger provided in the tapered bottom portion of said reactor;

(2) the molecular oxygen or molecular oxygen-containing gas is dispersed in the reaction liquid by means of a draft tube having an open top and bottom and positioned vertically above said gas sparger and a distributor provided above and spaced from said draft tube;

(3) the reaction material comprising p-dialkylbenzene or intermediate oxidation product thereof, aliphatic monocarboxylic acid of 2-4 carbon atoms, and heavy metal oxidation catalyst is supplied into the reactor at such a rate that $l/L$ is ¼–⅓, L being the distance from the entrance of the sparger for supplying molecular oxygen or molecular oxygen-containing gas into the reaction liquid to the surface level of the reaction liquid in the reactor, and $l$ is the distance from the material feed entrance for supplying the starting mixture into the reactor, to the reaction liquid level in the reactor, both the entrance of the sparger and the material feed entrance being below the surface level of the reaction liquid in the reactor;

(4) the temperature of the reaction mixture in the reactor is controlled at the predetermined level within the range of 80–150° C.; and (5) the pressure inside the reactor is controlled to be within the range of atmospheric to 100 atmospheres.

2. The method of claim 1, wherein a portion of said molecular oxygen or molecular oxygen-containing gas is supplied into the reaction liquid in the reactor from said gas sparger at the bottom portion of the reactor body, and the remainder of said molecular oxygen or molecular oxygen-containing gas is supplied into the reaction liquid from a second gas sparger having numerous perforations, which second gas sparger is positioned above and spaced from the draft tube and serves also as the distributor, thereby dispersing the molecular oxygen or molecular oxygen-containing gas in the reaction liquid.

3. The method of claim 1, wherein acetic acid is used as the solvent, and as the heavy metal oxidation catalyst, a cobalt compound which is soluble in acetic acid is used.

4. The method of claim 1, wherein the quantity of the molecular oxygen or molecular oxygen-containing gas supplied into the reactor is controlled to be 0.8–20 cm.$^3$/cm.$^2$.sec., in terms of superficial gas velocity of the gas in the reaction liquid in the reactor.

5. The method of claim 1, wherein the quantity of the molecular oxygen or molecular oxygen-containing gas supplied into the reactor is controlled to be 0.9–10 cm.$^3$/cm.$^2$.sec., in terms of superficial gas velocity of the gas in the reaction liquid in the reactor.

References Cited

UNITED STATES PATENTS

| | | | |
|---|---|---|---|
| 3,154,577 | 10/1964 | Carter et al. | 260—524 |
| 3,155,718 | 11/1964 | Brown et al. | 260—524 |
| 3,161,476 | 12/1964 | Lemetre et al. | 260—524 |
| Publication | | | |
| T 861,029 | 4/1969 | Kirby | 260—524 |

LORRAINE A. WEINBERGER, Primary Examiner

R. S. WEISSBERG, Assistant Examiner

U.S. Cl. X.R.

23—284

UNITED STATES PATENT OFFICE
CERTIFICATE OF CORRECTION

Patent No. 3,660,476    Dated May 2, 1972

Inventor(s) ICHIKAWA ET AL

It is certified that error appears in the above-identified patent and that said Letters Patent are hereby corrected as shown below:

Claim 1, line 2 of (1), delete "dispersed in the reaction liquid by" and insert therefor --fed into the reaction system from said--

Signed and sealed this 25th day of July 1972.

(SEAL)
Attest:

EDWARD M. FLETCHER, JR.
Attesting Officer

ROBERT GOTTSCHALK
Commissioner of Patents